(12) United States Patent
Boge et al.

(10) Patent No.: US 7,347,001 B2
(45) Date of Patent: Mar. 25, 2008

(54) PRE-MOUNTING OF A SENSOR

(75) Inventors: Ludwig Boge, Jena OT Jenapriessnitz/Wogau (DE); Heinz-Gunther Franz, Hamburg (DE); Hans-Joachim Freitag, Erfurt (DE); Andreas Schmidt, Erfurt (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 71 days.

(21) Appl. No.: 11/186,625

(22) Filed: Jul. 21, 2005

(65) Prior Publication Data
US 2006/0150430 A1 Jul. 13, 2006

(30) Foreign Application Priority Data
Jul. 23, 2004 (EP) ................... 04017467

(51) Int. Cl.
*G01B 5/24* (2006.01)
(52) U.S. Cl. ......................... 33/613; 33/568
(58) Field of Classification Search ................. 33/568, 33/569, 570, 573, 613, 645
See application file for complete search history.

(56) References Cited

U.S. PATENT DOCUMENTS

| 1,097,185 | A | | 5/1914 | Oehrle |
| 3,158,045 | A | * | 11/1964 | Siler .......................... 33/645 |
| 4,538,355 | A | * | 9/1985 | Morghen .................... 33/613 |
| 4,667,922 | A | * | 5/1987 | Cutburth et al. ............ 248/664 |
| 4,687,165 | A | | 8/1987 | Blackburn |
| 4,700,488 | A | * | 10/1987 | Curti .......................... 33/613 |
| 4,805,888 | A | | 2/1989 | Bishop |
| 5,481,945 | A | * | 1/1996 | Whipple et al. ............. 33/569 |
| 6,049,992 | A | | 4/2000 | Feitag et al. |
| 6,105,915 | A | * | 8/2000 | Naman et al. ........... 248/309.1 |
| 6,526,206 | B2 | * | 2/2003 | Kunkel et al. ............... 33/645 |
| 6,640,452 | B1 | * | 11/2003 | Bieg ........................... 33/503 |
| 6,722,052 | B2 | * | 4/2004 | Wu .............................. 33/613 |
| 7,188,433 | B2 | * | 3/2007 | Boge et al. .................. 33/706 |
| 2002/0181881 | A1 | * | 12/2002 | Kunkel et al. ............... 33/645 |

FOREIGN PATENT DOCUMENTS

DE 197 00 367 A1 7/1998

* cited by examiner

*Primary Examiner*—G. Bradley Bennett
(74) *Attorney, Agent, or Firm*—Patterson, Thuente, Skaar & Christensen, P.A.

(57) ABSTRACT

What is described is a pre-mounting system for pre-mounting a structural part to an attachment surface, wherein at least two heads, respectively provided as eccentrics, are provided at the attachment surface, the structural part comprises at least one recess and can be hung up on the attachment surface by said heads engaging said recess/recesses.

11 Claims, 6 Drawing Sheets

PRE-MOUNTING OF A SENSOR

FIELD OF THE INVENTION

The invention relates to a pre-mounting device for a structural part which is mountable in an adjusted position to an attachment surface. The invention further relates to a structural part which is pre-mounted by means of said pre-mounting element. Further, the invention relates to a pre-mounting system for pre-mounting a structural part to an attachment surface, as well as to a method of mounting a structural part to an attachment surface.

BACKGROUND OF THE INVENTION

In many cases, structural parts have to be mounted to attachment surfaces in predetermined positions. The predetermined position is usually set in an adjusting step and the structural part is then finally mounted to the attachment surface. The adjusted position should, of course, remain unchanged as far as possible. This problem is exemplified, for example, in length or angle measuring systems, in which a transducer element to be optically sensed has to be mounted to the corresponding machine part in a position which has to be exactly adjusted. This is mentioned, inter alia, in U.S. Pat. No. 5,979,283.

The final mounting by an adhesive bond as mentioned in the introduction of said document stringently requires the adjusted position to be set before initiating the adhesive bonding, because corrections are not possible after the adhesive bond has been realized.

Therefore, in such applications, in particular where final mounting is effected by means of an adhesive bond, it has turned out to be favorable to pre-mount the structural part first to the attachment surface by suitable means and to then perform final mounting only after said adjustment has been obtained. In the pre-mounted condition, the desired adjusted position of the structural part is provided, so that final mounting, i.e. the final attachment of the structural part to the attachment surface, can then be performed.

SUMMARY OF THE INVENTION

It is an object of the invention to provide those skilled in the art with means for pre-mounting a structural part to be mounted to the attachment surface in an adjusted position, said means allowing easy pre-mounting and, in particular, easy adjustment.

According to the invention, this object is achieved by a pre-mounting device for a structural part to be mounted to an attachment surface in an adjusted position, said pre-mounting device comprising at least two heads, each of said heads being rotatably mountable to the attachment surface and each being eccentric and allowing the structural part to be suspended therefrom such that the position of the suspended structural part is adjustable by rotating said heads. Associated with said pre-mounting element is a suitably adapted structural part which cooperates with the pre-mounting element. Therefore, a structural part for pre-mounting comprising the aforementioned pre-mounting element is further provided, according to the invention, said part comprising at least one recess, by which the structural part can be suspended from the heads of the pre-mounting element, and means for final mounting which secure the structural part to the attachment surface in the adjusted position.

The object is further achieved by a pre-mounting system for pre-mounting a structural part to an attachment surface, wherein at least two heads, respectively provided as eccentrics, are provided at the attachment surface, and the structural part comprises at least one recess and is suspendable from the attachment surface by said heads engaging said recess/recesses. Finally, the object is further achieved by a method of mounting a structural part to an attachment surface, with at least two heads being rotatably mounted, in preparation, to the attachment surface, each of which heads is provided as an eccentric, are adjusted by rotating the heads for adjustment, so that the upper or lower edges of the eccentrics have a determined position, the structural part, which comprises at least one recess matching the heads, is hung up on or suspended from the attachment surface by means of the heads and, ultimately, the structural part is finally mounted to the attachment surface.

Thus, according to the invention, a pre-mounting device comprising elements operating as eccentrics is provided. Fine adjustment is effected by pivoting the eccentrics, allowing positional adjustment of a structural part which is also provided according to the invention suspendable from the eccentric heads.

The fine adjustment provided by the eccentrics allows a precision of positional adjustment clearly exceeding the precision with which the heads can be mounted to the attachment surface.

The system according to the invention provides pre-mounting, on the one hand, by mounting the eccentrically formed heads to the attachment surface and, on the other hand, by hanging up the structural part to be mounted on the attachment surface by means of the heads in the pre-mounting position. If the heads are located on the part on which the other structural part is hung up, the upper edges of the eccentric heads naturally determine the adjustment position. Consequently, the upper edge is then also adjusted by pivoting the eccentrics. In contrast thereto, if the heads are provided on the structural part which is suspended from the other part, the heads contact the lower edges so that the adjustment also has to be made regarding the lower edges.

In principle, hanging-up of the structural part may be effected by means of said heads in almost any desired manner. Conveniently, a securing means will be additionally provided so as to prevent the structural part from falling off after being hung up. A possible measure for this purpose is a stepped structure on the heads in engagement with a corresponding back taper of the recess.

In a particularly advantageous further embodiment, such securing means against falling off may be provided such that it is effective for different distances between the structural part and the attachment surface. The eccentrics may then be used for differently dimensioned structural parts. A particularly simple measure for achieving this is a frustum portion on the heads which tapers toward the attachment surface.

Such frustum portion may be additionally employed to pull the structural part toward the attachment surface if the recess of the structural part has a back taper contacting the frustum portion when the structural part is hung up. The back taper then engages with the frustum portion, and the structural part is pulled toward the attachment surface by gravity, if the recess provides sufficient space for the head. Particularly stable positioning in the pre-mounting position is achieved if the back taper is provided as an inclined plane matching the frustum surface.

As already mentioned, the eccentric shape of the heads serves for fine adjustment during or prior to pre-mounting. If the heads further have the aforementioned back taper, the contour line of the head which is the outermost contour line when viewed from above, determines the position of the structural part after being hung up. In order to reduce or exclude any disadjustments, in this case, caused by clearance, it is convenient to provide a cylindrical portion connected with the frustum portion, as seen in the direction of the attachment surface. The aforementioned outermost contour of the heads is then formed by a cylindrical contour surface which provides a clearly defined contact surface. This applies, in particular, if the recess comprises a corresponding counter-surface which contacts the cylindrical portion when the structural part has been hung up.

It is particularly advantageous if the heads as well as the recess are designed such that, during final mounting, i.e. when the structural part is immovably secured to the attachment surface, a possible displacement of the structural part is effected by the counter-surface sliding on the cylindrical portion. This may allow such displacement to be a movement in only one direction. This direction may advantageously be selected such that it is irrelevant or at least non-critical for adjustment of the structural part. It is also possible to design this now exactly defined displacement as an aiming-off allowance or offset during adjustment, so as to achieve an exactly defined, desired adjustment position of the finally mounted structural part.

At least two heads are required to suspend the structural part. However, depending on the length of the structural part, a greater number of heads may also be used, which has the advantage that the requirements concerning the bending resistance of the structural part are reduced. In particular, it is convenient to provide a spacing between a plurality of heads such that said spacing between the heads prevents flexure of the suspended structural part beyond a certain acceptable measure.

The adjustment of the heads by eccentric pivoting may be effected either before or after suspension of the structural part. If the heads are adjusted before the structural part is hung up, the (upper or lower) edges which are relevant to the adjustment of the heads will conveniently be adjusted relative to a reference by suitable measuring means, which reference may be, for example, an element of the part comprising the attachment surface.

In contrast thereto, for the variant wherein the heads are adjusted after suspension of the structural part, the position of the structural part itself relative to a suitable reference will be detected. Such design requires further suitable means allowing rotation of the heads while the structural part hangs on the heads. A convenient realization of these means may be, for example, a breakthrough through which each head can be driven in rotation.

For final assembly, material-locking connections (e.g. adhesive bonds) or form-locking or force-locking connections (screws, clamps) are suitable. For adhesive bonding, it is convenient to use the above-mentioned, easily applicable variant with an adhesive layer which may be provided either on the structural part or on the attachment surface. The final mounting in which the spacing is closed by pressing the structural part onto the attachment surface then represents the beginning of said adhesive bonding. If a pressure-activatable adhesive layer is used, activation of the adhesive is also caused at the same time.

BRIEF DESCRIPTION OF THE DRAWINGS

The invention will be explained in more detail below, by way of example and with reference to the Figures, wherein.

DETAILED DESCRIPTION

Figure 1:
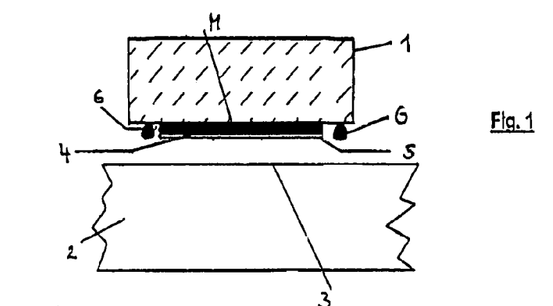
FIG. 1 shows a schematic sectional view of a sensor element being adjusted and mounted to a structural part.

FIG. 1 shows a schematic sectional view of a sensor element 1, in a phase of the mounting process, before the sensor element 1 is mounted to a part 2. In the embodiment shown, the sensor element 1 is part of a measuring system (not shown in detail), which detects, for example, the movement of one machine part relative to another machine part. However, the sensor element may also be any other structural part which is to be mounted to an attachment surface or an attachment part in a determined position to be adjusted. It is merely essential for the following description that the element 1 be mounted to the part 2, e.g. to an attachment surface thereof, to achieve a position adjusted with high precision. The adjustment may relate to the part 2 or to a third part.

Mounting of the sensor element 1 to the part 2 is effected by connecting a mounting surface M of the sensor element 1 to the attachment surface 3, e.g. by means of an adhesive bond. For this purpose, an adhesive layer 4, which glues the sensor element 1 to the attachment surface 3, is provided on the mounting surface M of the sensor element 1 associated with the part 2 or with the attachment surface 3, respectively. Of course, the adhesive layer 4 can also be provided on the part 2. Since mounting of the sensor element 1 is usually effected only after providing the part 2 and, thus, on site, the adhesive layer 4 is usually covered by a protective paper 5 in order to prevent undesired activation of the adhesive layer 4 prior to mounting and, in particular, prior to final mounting of the sensor element 1.

For mounting, the protective paper 5 is pulled off the adhesive layer 4 in a preparatory step. This is followed by a pre-mounting step, in which the mounting surface M of the sensor element 1 is placed onto the attachment surface 3. In an adjustment step, the desired position for the sensor element 1 is then adjusted with high precision and, in a final mounting step, the adhesive layer 4 is finally activated in order to glue the sensor element 1 to the attachment surface 3. Usually use is made of pressure-activatable adhesives.

Figure 2:
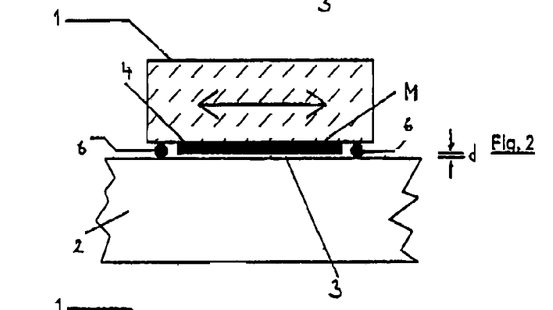
FIG. 2 shows the sensor element of FIG. 1 during the adjustment operation.

Since, in the case of pressure-activatable adhesives, contact of the adhesive layer 4 with the attachment surface initiates bonding, a system shown in FIG. 2 and comprising spacers 6, which support the sensor element 1 against the part 2 such that a spacing having a thickness d remains between the adhesive layer 4 and the attachment surface 3, is provided for obtaining the final position in the adjustment step. Only when the sensor element 1 is positioned as desired (e.g. relative to the part 2) in the mounting process, adhesion is effected by removing and/or compressing the spacers. Since a change in the position of the sensor element 1 after adjustment would automatically lead to disadjustment, shifts in position after adjustment and prior to gluing the sensor element 1 to the part 2 should be avoided, as far as possible. Depending on the application, shifts in position of less than 10 µm are ideal. Therefore, in linear or angle measurement systems, d is preferably between 5/10 and 1/00 mm.

The spacers 6 shown in FIG. 2 position the mounting surface M comprising the adhesive layer 4 with a defined minimal spacing above the attachment surface 3, so as to allow easy positioning of the sensor element, for example in the direction of the double arrow schematically represented in FIG. 2, in the adjustment step. Since, apart from the thickness d of the gap, the sensor element 1 already has the correct distance to the part 2 in this adjustment position, a sensing unit, which is provided for the sensor element anyway, may preferably be used for adjustment. Of course, suitable additional optical, mechanical, electrical or otherwise acting adjusting means can be employed as well.

Figure 3:
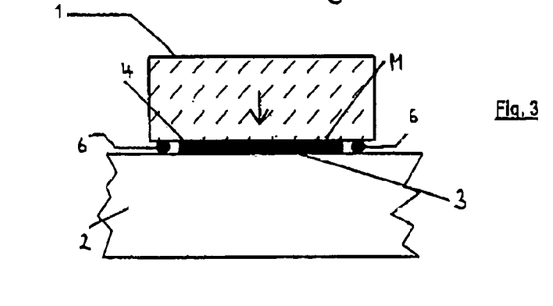
FIG. 3 shows the sensor element of FIG. 2 after the completed adjustment operation and during final mounting.

For example, using the sensing unit, it is verified in the adjustment step whether the sensor element 1 is in the correct, finally adjusted position. Once said position is set, the sensor element 1 is glued to the attachment surface 3 by pressing it thereon in the final mounting step, as schematically shown in FIG. 3. When applying pressure in this manner, in the direction of the arrow shown in FIG. 3, the spacers 6 are deformed and the gap is closed.

The spacers 6 shown in FIGS. 1 to 3 and acting in the adjustment step may be realized, for example, in the form of deformable elements, e.g. by elastic cords, or the like. The construction shown in FIGS. 2 and 3 allows to pull the spacers out laterally after gluing, i.e. in the condition of FIG. 3, so that the adhesive bond is not subjected to stresses by a possible elastic restoring force. However, a suitably stable adhesive connection may also allow the spacers 6 to remain in place. The spacers 6 realize a stable adjustment position of the sensor element 1. Therefore, they are designed to match the attachment surface 3.

Figure 4:
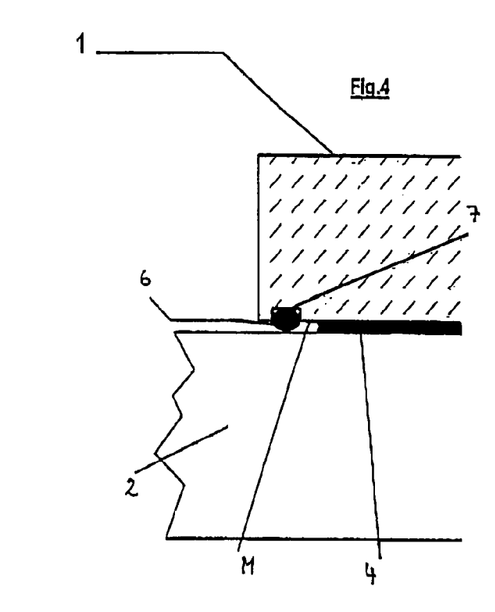
FIG. 4 shows a view of a detail of a sensor element similar to that of FIG. 3 in the finally mounted condition.

FIG. 4 shows an alternative embodiment similar to that of FIGS. 1 to 3. In this case, a groove 7, in which the spacers 6, which are again realized as elastic cords here, are inserted and held, is provided on the sensor element 1. Due to the groove 7, the sensor element 1 can be shipped already comprising spacers 6, because they are held in the groove 7, preferably undetachable. Of course, in this case, too, removal of the spacers after final assembly may be envisaged, for example, by pulling the spacers 6 out of the groove 7. The groove 7 not only holds the spacers 6, but also acts as a displacement space into which material may evade during deformation of the spacers 6. The groove 7 not only holds the spacers 6, but also acts as a displacement space into which material may evade during deformation of the spacers 6. This allows the spacers to be comparatively bulky as compared to the thickness of the adhesive layer 4. Of course, the groove 7 is only one example of the design of the displacement space.

Figure 5:
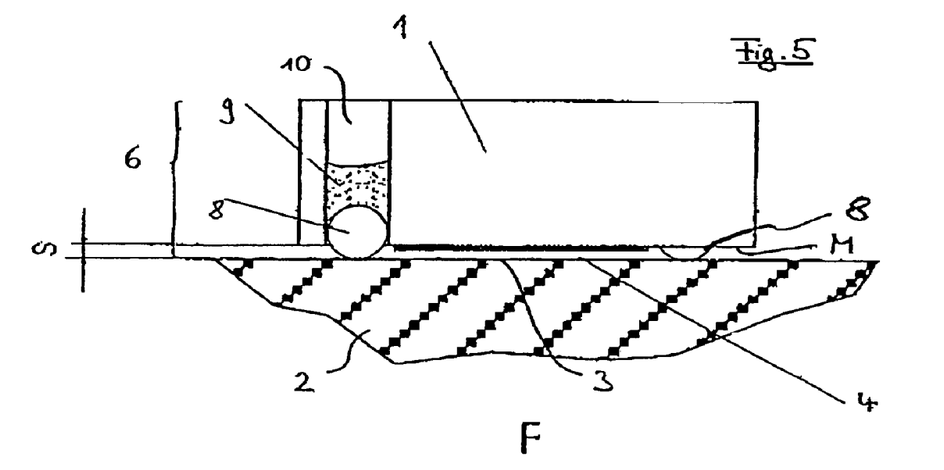
FIG. 5 shows a sectional view of another sensor element in the condition of the element of FIG. 2.
Figure 6:
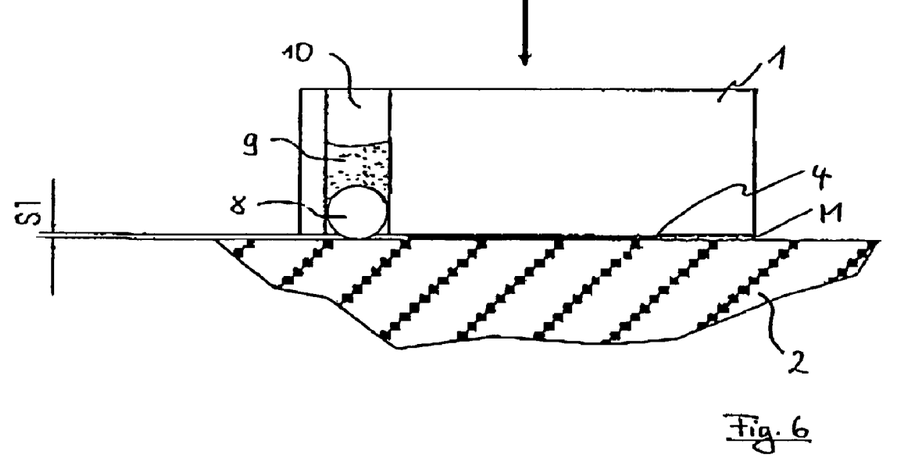
FIG. 6 shows the sensor element of FIG. 5 in the condition of the element of FIG. 3.

A further alternative embodiment, which is shown in FIGS. 5 and 6, clearly shows that the spacers may also be of a multi-part design. The deformable spacers inserted, as shown in FIG. 2, between the attachment surface 3 and the bottom surface of the sensor element 1 are realized, in the construction shown by the sectional view of FIG. 5, by a largely rigid body, realized as a ball 8, which is held by a deformable adhesive 9 in a bore 10. Thus, the spacers are of a multi-part design, comprising a rigid portion (ball 8) and a deformable portion (adhesive 9). The bracket 6 makes this general constructional principle clear.

The spacers 6 again realize a gap, because each ball 8 protrudes from the bottom surface of the sensor element 1 by the amount S. Due to the thickness of the adhesive layer 4, a gap is thus set between the adhesive layer 4 and the attachment surface 3. By applying a force F in the direction of the arrow shown in FIG. 6, each ball 8 is pushed into the bore 10 while deforming the adhesive 9, and the adhesive layer 4 glues the sensor element 1 to the attachment surface 3. The ball 8 is pushed into the bore 10 leaving a residual gap S1 whose thickness corresponds to that of the adhesive layer 4.

In the position of FIG. 5, i.e. with the spacers 6 not yet deformed, the sensor element 1 can be adjusted to the desired position at the part 2; in this connection, what was said with reference to FIG. 1 to 3 also applies to this embodiment.

The construction according to FIGS. 5 and 6 clearly shows that the spacers 6 have two fundamentally different functional features here. On the one hand, they provide a predetermined gap between the mounting surface M of the sensor element 1 and the attachment surface 3 to which the sensor element 1 is to be mounted. Said gap is dimensioned such that gluing of the sensor element 1 does not yet take place, and an adjustment is still possible. Further, the spacers 6 are changeable such that the gap can be closed, e.g. by pressing the sensor element 1 toward the attachment surface 3. This allows the adhesive connection to be activated, but it is of no consequence to the effect and use of the spacers whether said adhesion is effected by means of an adhesive layer provided on the sensor element 1 or on the attachment surface 3. The change of the spacers 6 may be caused by deformation or also by removal of the spacers.

Of course, the principle of the spacers may also be reversed by providing the spacers on the part 2.

In particular, the deformation of the spacers 6 may be effected in an elastic or inelastic manner. The spacer may also have a multi-part design and one portion thereof may be provided, for example, as a special deformable element, which is realized by the adhesive 9 in the construction according to FIGS. 5 and 6. The use of an inelastic body which is supported on the deformable element allows the stroke of deformation and, above all, the force of deformation, which have to be surmounted when applying pressure to the sensor element 1, to be exactly set. If it is desired, for example, to modify the construction of FIG. 5 in terms of an elastic deformation of the spacers 6, the adhesive 9 may be replaced, for example, by a spring element supported in the bore 10.

Figure 7:
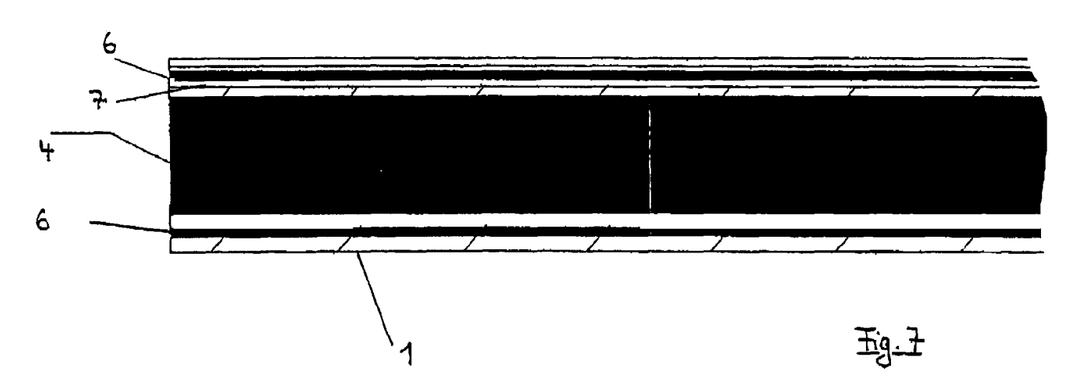
FIG. 7 shows a top view of an embodiment of the sensor element shown in sectional views in FIGS. 1 to 6.

FIG. 7 shows a view of the sensor element 1 of FIGS. 1 to 4, seen from the side comprising the adhesive layer 4. As can be seen, the elastic cord realizing the spacer 6 in this case is located in the groove 7 outside the region to which the adhesive layer 4 is applied. In FIG. 7, the sensor element 1 is shown, by way of example, as a rule of a length measuring system. Since such measuring systems are conventionally employed on machine tools, a second effect of the spacers 6 is advantageously put into practice here. The spacers 6 protect the adhesive layer along at least two longitudinal edges against intrusion of impurities or of substances impairing adhesion, such as oils or solvents. Such protection is generally present with non-punctiform spacers 6, if they outwardly limit the adhesive layer 4 at least partially. Said protection is even better the more completely the spacer 6 surrounds the region in which the sensor element 1 is glued to the attachment surface 3.

Figure 8:
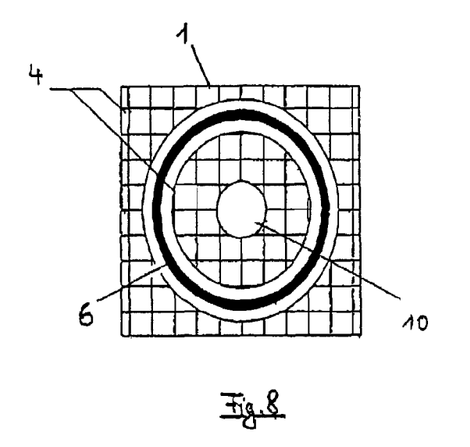
FIGS. 8 and 9 respectively show top views, analogous to FIG. 7, of further embodiments.

FIG. 8 shows an embodiment of a sensor element 1, wherein the spacer 6 is ring-shaped and completely surrounds an inner region of the adhesive layer 4. In order to secure the adhesive bond, a bore 10, through which a fastening element, e.g. a screw or a rivet, may be inserted, is provided in addition. In the embodiment example of FIG. 8, the bore 10 is formed in the center of the sensor element 1, because a screw connection is provided there.

Figure 9:
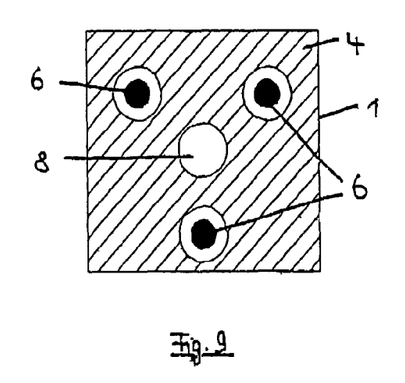

FIG. 9 shows an alternative embodiment of the sensor element 1 of FIG. 8. In this case, the spacer 6 provides a three-point contact, which causes a high-precision, tilt and interference free adjustment of the gap S between the attachment surface 3 and the sensor element 1. For such punctiform contact as effected by the spacers 6 in three points, spacers of the type shown in FIG. 5 are suitable, in particular, because the balls 8 shown therein are each contacting in a punctiform manner.

Figure 10:
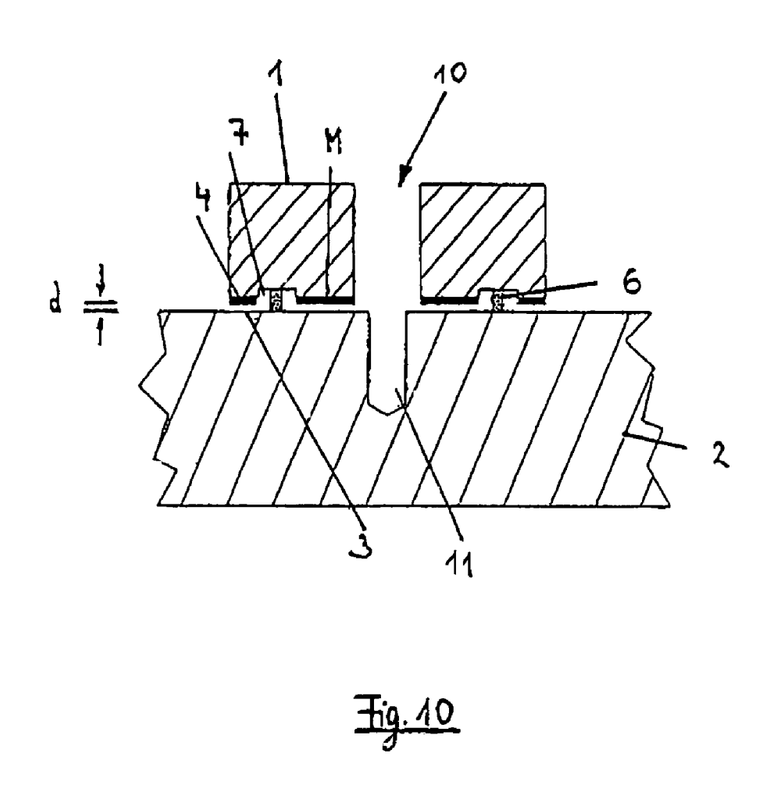
FIG. 10 shows a sensor element similar to that of FIG. 8 in a representation similar to FIG. 2, i.e. during adjustment and prior to final mounting.

FIG. 10 shows the sensor element 1 of FIG. 8, wherein the spacer 6, in contrast to the construction of FIGS. 1 to 4, is not elastically deformable here, but is deformed inelastically, i.e. permanently, in the final mounting step. The bottom surface of the sensor element 1, to which the adhesive layer 4 is also applied, has an annular groove 7 formed therein, in which an annular spacer 6, which is elastically deformable, is mounted in this embodiment. Suitable materials for such spacers 6 are, for example, styrofoam or latex foam rubber. The adhesive layer 4 is provided inside and outside of the ring of the annular groove 7.

Figure 11:
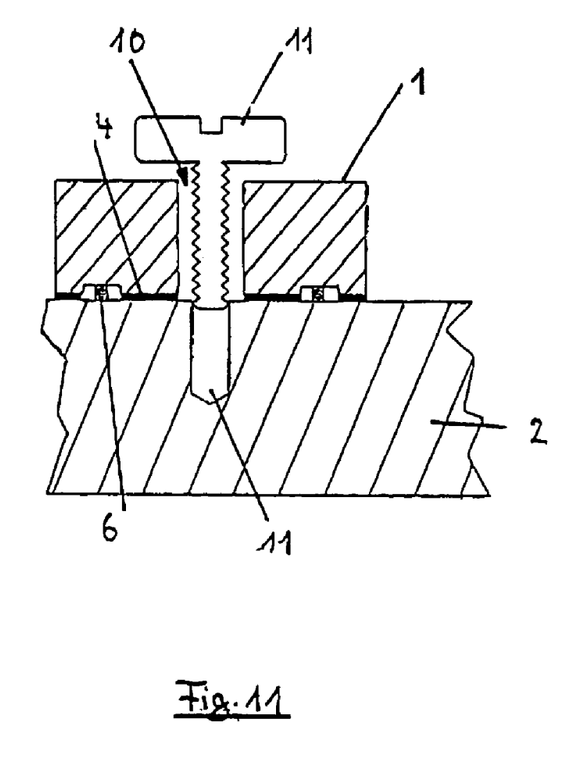
FIG. 11 shows the sensor element of FIG. 10 in the finally mounted condition.

The example of FIG. 11 also has the optional bore 10 provided, which serves to secure the sensor element 1 on the machine part 2. A securing element is inserted through the bore 10, which element is provided in the construction of FIG. 11 as a screw connection 11 between a thread located in a blind-hole and a screw.

For pre-mounting, the sensor element 1 is placed on the attachment surface 3, e.g. a shaft flange. The spacers 6 create a gap having the thickness d. FIG. 10 shows the sensor element 1 after the pre-mounting step, in the position for adjustment in which the sensor element 1 is positioned in a manner suitable for the application. For example, the bore 10 is centered relative to the axis of rotation of a rotary machine part. Said adjustment is easy because the spacer 6 ensures the determined gap between the adhesive layer 4 and the attachment surface 3. If the desired adjustment is achieved, which can be verified by resorting to a sensing unit which senses the sensor element 1, the sensor element 1 is pushed toward the machine part in a final mounting step. The spacers 6 are deformed and the gap is closed. The adhesive layer 4 glues the sensor element 1 to the attachment surface 3.

For additional mounting or securing, the screw connection 11 is then tightened by means of the screw engaging the threaded hole, as shown in FIG. 11. The spacer 6 which was deformed by applying pressure to the sensor element 1, remains in the annular groove 7. However, the screw connection may also assist as a pre-mounting means in realizing the adjustment position by enabling a positional adjustment in the adjustment portion and then causing final mounting with a deformation of the spacer 6 and adhesion (e.g. by tightening the screw connection).

When applying pressure during final mounting a sufficiently defined characteristic deformation curve of the spacers 6 is essential for maintaining the position previously adjusted in the adjustment step. Thus, in principle, three different types of spacers are suitable.

The spacers may comprise elastic materials, so that at least one portion of each spacer is elastically deformed when applying pressure to the adhesive. In particular, high-strength resilient materials may be employed, if the geometry of the spacers 6 is designed such that pressing-on of the sensor element against the resilient effect of the spacer 6 is achievable with a tolerable force.

For the spacers, inelastic deformation may also be employed. This has the advantage that, once the spacers 6 have been deformed, no force is built up that might put stress on the adhesive bond.

Moreover, the spacers may, of course, also be removed so as to initiate the adhesive bonding at the adhesive layer 4. They may then even be non-deformable, and elastic forces of the spacers will no longer play a role.

The above-described sensor element is an example of a structural part which has to be mounted to another structural part in a predetermined position. In doing so, the approaches pursued here follow the path of first effecting a pre-mounting during which the structural part is not finally mounted yet. At first, the final position to be assumed is adjusted to the best possible extent. This may be effected with or without the cooperation of the structural part 1. In a subsequent final mounting step, the structural part is then finally brought into the target position and simultaneously fixed; in the described embodiments, this is done by gluing.

The following Figures relate to effecting the pre-mounting as easily as possible by pre-mounting means. The specific design of the structural part does not matter; in particular, the spacers for the pre-mounting means can be omitted, depending on the type of final mounting.

Figure 12:
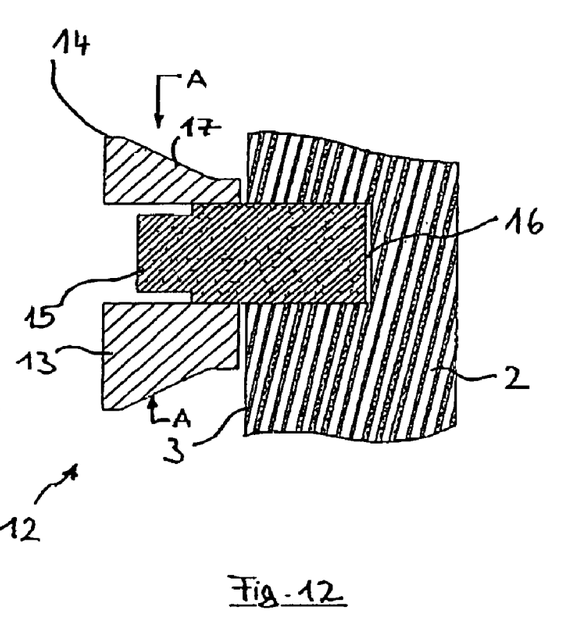
FIG. 12 shows a sectional view of a pre-mounting device for producing an adjustment position during the adjustment operation.

FIG. 12 shows a pre-mounting means 12, which acts between the machine part and the sensor element. To this end, the pre-mounting means 12 comprises cooperating elements both on the machine part and on the sensor element. On the machine part 2, on which the sensor element 1 is to be mounted later, the pre-mounting means 12 comprises a head 13 which is circumferentially formed as an eccentric 14. The head 13 is located on a pin 15, which is pressed into a bore 16 formed in the machine part 2. This press fit causes the pin 15 to be fixed to the machine part 2 locked against rotation. In contrast thereto, the head 13 is rotatable on the pin 15.

This functional effect of the pre-mounting means 12 can, of course, be achieved also by connecting the head 13 and the pin 15 locked against rotation and by holding the pin 15 rotatably in the bore 16, e.g. by interposition of a viscous medium introduced into the bore 16 prior to insertion of the pin 15.

In addition to the contour line in the shape of an eccentric 14, the head 13 has a frustum-shaped surface 17 which tapers toward the machine part 2. Thus, a frustum-type eccentric having a cylindrical contour surface is obtained. The head 13 thus has a frustum portion and a cylinder portion (the latter being referred to hereinafter as eccentric 14).

Figure 13:
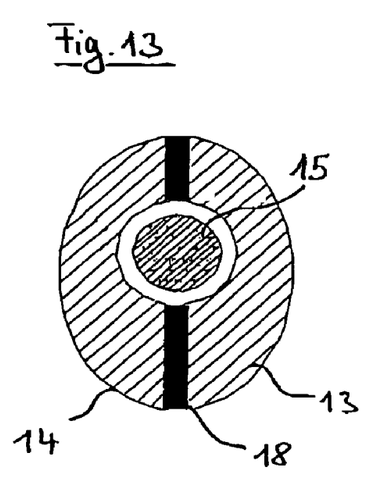
FIG. 13 shows a top view of the pre-mounting device of FIG. 12.

The eccentricity is clearly visible in the sectional view of FIG. 13, which was obtained along the line A-A of FIG. 12. Of course, any eccentric, e.g. a circular disk with a decentrally placed axis, will suffice. FIG. 13 further shows that the eccentric 14 has a slot 18 into which a screw driver may be inserted, in order to pivot the eccentric about the pin 15. Said pivoting, as will be explained later, serves to set the adjusted position.

FIGS. 14 to 19 show how the sensor element 1 is mounted to the machine part 2 using the pre-mounting means 12. With regard to the machine part 2 and the sensor element 1, the representation is merely illustrative; what is of importance is essentially the effect of the pre-mounting means 12, as will be explained below by way of example. In particular, the sensor element 1 need not necessarily comprise the above-mentioned spacers 6 for such effect of the pre-mounting means 12.

In addition to the aforementioned heads 13, the pre-mounting means comprise one or more matching recesses 21 on the sensor element 1, using which the sensor element 1 may be suspended from the heads 13. The pre-mounting means 12 are thus essentially formed by two components; on the one hand, the heads 13 which are mounted to the machine part 2, and on the other hand, by one or more recesses 21, by which the sensor element 1 may be suspended from the heads 13. Of course, the construction shown in FIGS. 14 to 19 may also be exchanged in terms of the arrangement of heads 13 and recesses or recess 21 by providing one or more heads 13 on the sensor element 1 and the corresponding recesses associated therewith, or one continuous recess, on the machine part 2.

Figure 14:
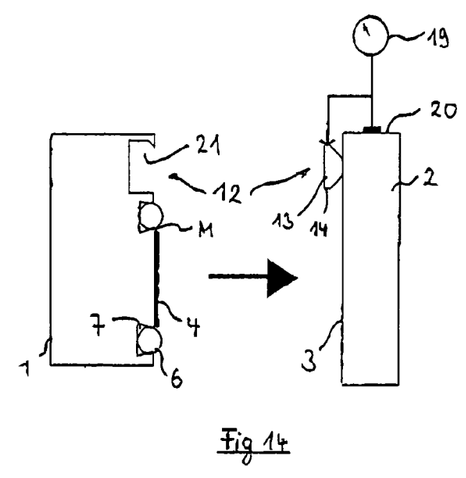
FIG. 14 shows a sectional view of a sensor element similar to FIG. 4, but comprising the pre-mounting device of FIGS. 13 and 14, during the adjustment operation.
Figure 15:
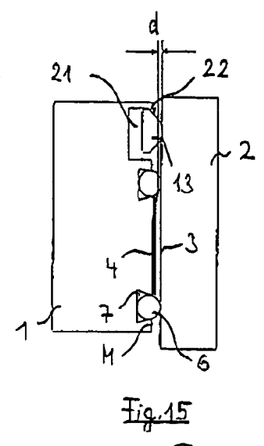
FIG. 15 shows a representation similar to FIG. 14 comprising an adjusted pre-mounting device, during pre-mounting.
Figure 16:
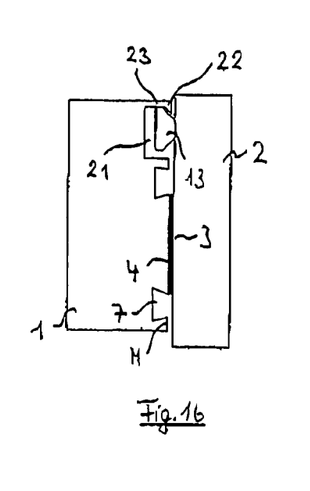
FIG. 16 shows the subassembly of FIG. 15 after final mounting.
Figure 17:
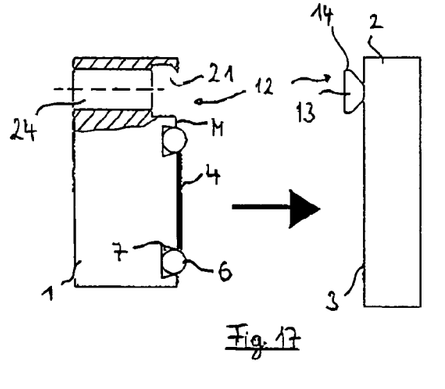
FIG. 17 shows a representation similar to that of FIG. 14, with the sensor element enabling adjustment in the pre-mounted condition.
Figure 18:
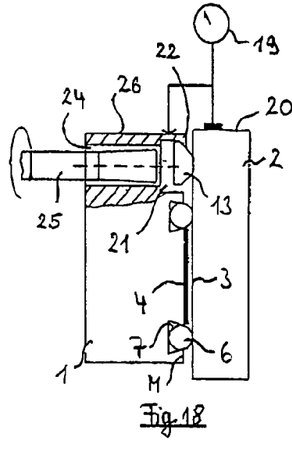
FIG. 18 shows a representation similar to FIG. 15, but with an adjustment taking place.
Figure 19:
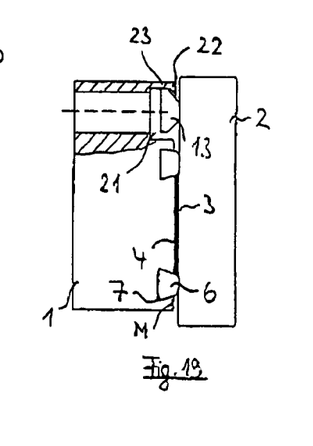
FIG. 19 shows a view similar to that of FIG. 16.

In the representations of FIGS. 14 to 19, the sensor element is shown, by way of example, as a linear transducer of a length measuring system. FIGS. 14 to 16 show a first possible structural variant of the pre-mounting means 12, while FIGS. 17 to 19 show a second variant.

For preparation for mounting, a series of heads 13 was first mounted to the attachment surface 3 of the machine part 2, of which heads the sectional views of FIGS. 14 to 19 each show only one. The sensor element 1 may be suspended from the heads 13. Thus, a separate auxiliary element for rigidifying and positioning the sensor element 1 may be omitted.

In the adjustment step, the eccentrics 14 of the heads 13 according to the embodiment of FIGS. 14 to 16 are first adjusted by means of suitable measuring means, which are illustrated in FIG. 14 as a dial gauge 19, such that all eccentrics 14 have a predetermined position relative to the machine part 2.

The dial gauge 19 detects the position of each eccentric 14, i.e. of the cylindrical portion of the head 13, relative to a reference surface 20, which is provided on the machine part 2. For adjustment of the eccentric 14, each head 13 is rotated such that the upper rim of the eccentric 14 has a predetermined distance relative to the reference surface 20. The heads 13 provided in a row on the machine part 2 then consequently have an aligned upper rim of their eccentrics 14.

After this adjustment step, the pre-mounting follows, wherein, as shown in FIG. 14, the transducer element 1 is suspended from the heads 13 by its recess 21. The condition thus achieved is shown in FIG. 15. Together with the frustum-shaped surfaces 17 of the heads 13, a back taper 22 at the recess 21 has the effect that the suspended sensor element 1 can not slide off the heads 13, but is pulled toward the attachment surface 3 due to this specific design. The already effected adjustment of the eccentrics 14 then results in the sensor element 1 being in the desired adjusted position after completion of the pre-mounting step. As already explained above, the small size of the gap d allows to use measuring means for verifying the adjusted position, which means are present for sensing the sensor element anyway.

The spacers 6, which are realized as longitudinal elements here, advantageously cause the predetermined gap d between the adhesive layer 4 and the attachment surface 3. Now, in the final mounting step, the sensor element 1 is pressed onto the machine part 2, thus releasing the back taper 22 from the frustum-shaped surface of each head 13. The already obtained precise adjustment of the upper edge of the eccentric 14 (cf. FIG. 14) and the high-precision design of the recess 21 ensure that the predetermined, adjusted position is maintained when pressing the sensor element 1 onto the attachment surface 3.

In this case, the recess 21 is designed such that it comprises a contact surface 23 on which the eccentrics 14 slide when the sensor element 1 is pressed onto the attachment surface 3. The contact surface 23 of the recess 21 in connection with the adjusted eccentrics 14 causes the gap to be closed; apart from this change in the distance to the machine part 2, the position of the sensor element 1 remains unchanged in the adjusted condition. Thus, in the finally mounted condition of FIG. 16, the sensor element 1 is glued to the attachment surface 3 of the machine part 2 in the adjusted position; the spacers 6 have been removed from the grooves 7.

In contrast to the embodiment of FIGS. 1-5, in the construction of FIGS. 14 to 16 the adjustment step is carried out prior to pre-mounting. The spacers 6 are not involved in adjustment, but allow the high-precision final mounting in the already adjusted position.

This is different in the construction shown in FIGS. 17 to 19. In this case, the sensor element 1 is provided with a bore 24 which allows the heads 13 to be adjusted by means of a screw driver 25 when the sensor element 1 is already suspended from the heads 13. The representation of FIGS. 17 to 19 substantially corresponds to the view shown in FIGS. 14 to 16, so that reference is made to elements already described therein.

In FIG. 17, the sensor element 1 is suspended from the machine part 2 by means of the pre-mounting means 12, which in turn comprise the recess 21 and the heads 13. In contrast to FIG. 14, the heads, however, have not yet been adjusted.

The adjustment step is now carried out after pre-mounting; the corresponding condition is shown in FIG. 18. Again, the position relative to the reference surface 20 is detected with the help of a suitable measuring module, which may comprise, for example, a dial gauge 19. Now, however, not the position of the eccentric 14 itself, but that of a corresponding counter-surface 26 of the sensor element 1 is measured. Each eccentric 14 is rotated through the bore 24 by means of the screw driver 25 such that the desired position of the sensor element 1 relative to the reference plane 20 is achieved. In doing so, any flexure of the sensor element along its longitudinal axis (extending perpendicular to the drawing plane) is detected and minimized.

Subsequently, as already explained, the sensor element 1 is glued to the machine part 2 by pressing it thereon or by screwing it into the machine part 2. In the modification of the construction shown in FIGS. 14 to 16, the elastically deformed spacers 6 remain within the grooves 7 here.

What is claimed is:

1. A system comprising a structural part to be mounted in an adjusted position to an attachment surfacefor said system, which pre-mounting device comprises at least two heads, each of said heads being rotatably mountable to the attachment surface and each of said heads being eccentric and allowing the structural part to be hung up thereon such that the position of the hung-up structural part is adjustable by rotating said heads, wherein the system further comprises an adhesive layer either on the attachment surface or on the side of said structural part facing the attachment surface, and spacers for positioning the hung-up structural part with a defined spacing to the attachment surface and for activating the adhesive layer by changing the spacers such that the spacing can be closed.

2. The system as claimed in claim 1, wherein each head comprises a frustum portion which tapers toward the attachment surface.

3. The system as claimed in claim 2, wherein a cylindrical portion is arranged in front of the frustum portion in the direction of the attachment surface.

4. The system as claimed in claim 1, further comprising at least two pins for mounting to the attachment surface, each of said pins having one of the heads fitted thereon.

5. The system as claimed in claim 1, wherein each head comprises an engagement opening for insertion of a rotating tool.

6. The system as claimed in claim 1, wherein said structural part further comprises at least one recess by which the structural part can be hung up on the heads of the pre-mounting device and means for final mounting, for securing the structural part in the adjusted position to the attachment surface.

7. The system as claimed in claim 2 or claim 6, wherein the recess of the structural part has a back taper contacting the frustum portion when the structural part is hung up.

8. The system as claimed in claim 6, wherein the recess of the structural part is provided as a groove.

9. The system as claimed in claim 6, wherein at least one breakthrough is provided at the structural part through which each head can be driven in rotation.

10. A method of mounting a structural part to an attachment surface, the structural part having at least one recess present, the method comprising using the system of claim 1, rotatably mounting at least two heads, to the attachment surface, each of said heads being provided as an eccentric, adjusting the heads by rotation, so that upper and lower edges of the eccentrics have a determined position, engaging the heads by said at least on recess, thereby pre-mounting the structural part, and mounting the structural part to the attachment surface.

11. The method as claimed in claim 10, wherein the adjustment is carried out after pre-mounting, by rotational adjustment of the heads with the structural part hung up thereon.

* * * * *